Jan. 16, 1962 — A. M. KURZ ET AL — 3,016,710
CENTRAL HYDRAULIC SYSTEM
Filed Oct. 23, 1958 — 2 Sheets-Sheet 2

A. M. KURZ
W. A. VAN WICKLIN, JR.
INVENTOR.

3,016,710
CENTRAL HYDRAULIC SYSTEM
Alvin M. Kurz, Oak Park, and Warren A. Van Wicklin, Jr., Dearborn, Mich., assignors to Ford Motor Company, Dearborn, Mich., a corporation of Delaware
Filed Oct. 23, 1958, Ser. No. 769,210
8 Claims. (Cl. 60—54.5)

This invention relates to motor vehicle hydraulic systems, and more particularly to a coordinated hydraulic system for operating a plurality of hydraulically actuated devices.

A continuing trend in motor vehicle development is the increased use of power operated vehicle components. Many of these components are or may be hydraulically operated and at least two of them, power steering and power brake units, are usually so operated. Although each power device may be provided with its own power supply system, it is readily apparent that the duplication of motors, pumps and reservoirs or sump tanks represents an undesirable and expensive multiplication of units.

Accordingly, it is an object of the present invention to provide a central hydraulic system utilizing a single source of fluid pressure in combination with a hydraulic intensifier to provide a system in which power units requiring either low or high pressure fluid may be satisfied. More particularly, the present invention embodies a central hydraulic system which provides both a constant pressure supply for power brake operation and a constant flow supply for power steering. This is achieved by using the power steering pump, which normally only supplies hydraulic fluid to the power steering unit, in association with an intensifier. A constant flow from the pump is supplied to the intensifier and a small portion is diverted to an accumulator while the main flow continues to be supplied to the power steering unit. The intensifier amplifies the pressure of the diverted fluid until the accumulator is charged to its desired pressure. When the desired accumulator pressure is reached, a bypass unloading valve incorporated in the intensifier assembly shunts all the flow from the pump through the power steering control valve. The bypass flow continues until the pressure in the accumulator is reduced sufficiently to require the charging sequence to be repeated.

Other objects and advantages of this invention will be made more apparent as this description proceeds, particularly when considered in connection with the accompanying drawings, wherein.

Figure 1:
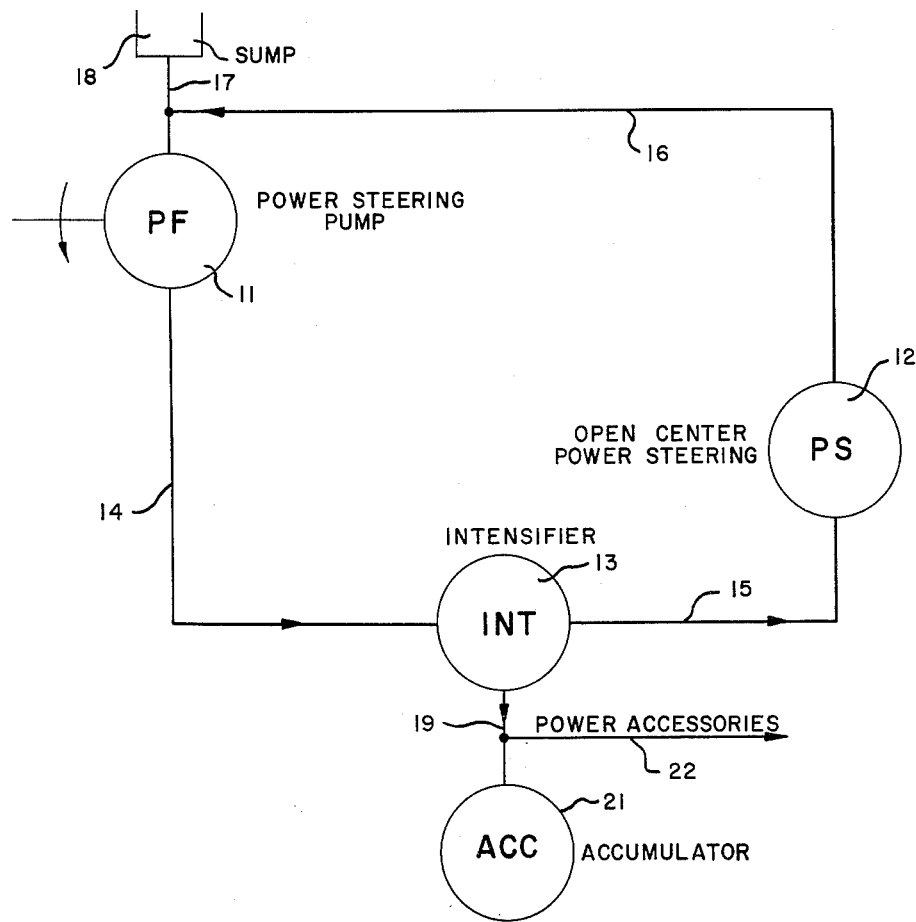
FIG. 1 is a diagrammatic view of a central hydraulic system incorporating the present invention.

Referring now to the drawings, and particularly to FIG. 1, the reference character 11 indicates generally a conventional hydraulic pump. This pump 11 is preferably of a type suitably driven by a power take-off from the vehicle engine and conventionally used to supply constant flow fluid to the power steering unit, generally designated 12. The unit 12 embodied in the hydraulic circuit of the present invention is preferably of the type conventionally known as an open center power steering unit. That is, in neutral position, the hydraulic fluid from the pump 11 flows unimpededly through the power steering unit control valve (not shown).

Interposed between the pump 11 and the power steering unit 12 is the intensifier 13. The intensifier is shown connected to the pump 11 by a conduit 14 and to the power steering unit 12 by conduit 15. The power steering unit 12 is shown connected by a return conduit 16 to the conduit 17 leading from a sump or reservoir 18 to the pump 11. The intensifier 13 is illustrated as having a second output conduit 19. The conduit 19, which is the high pressure conduit, is connected to an accumulator 21 and by conduit 22 to any other power accessories, such as the power brakes (not shown).

Figure 2:
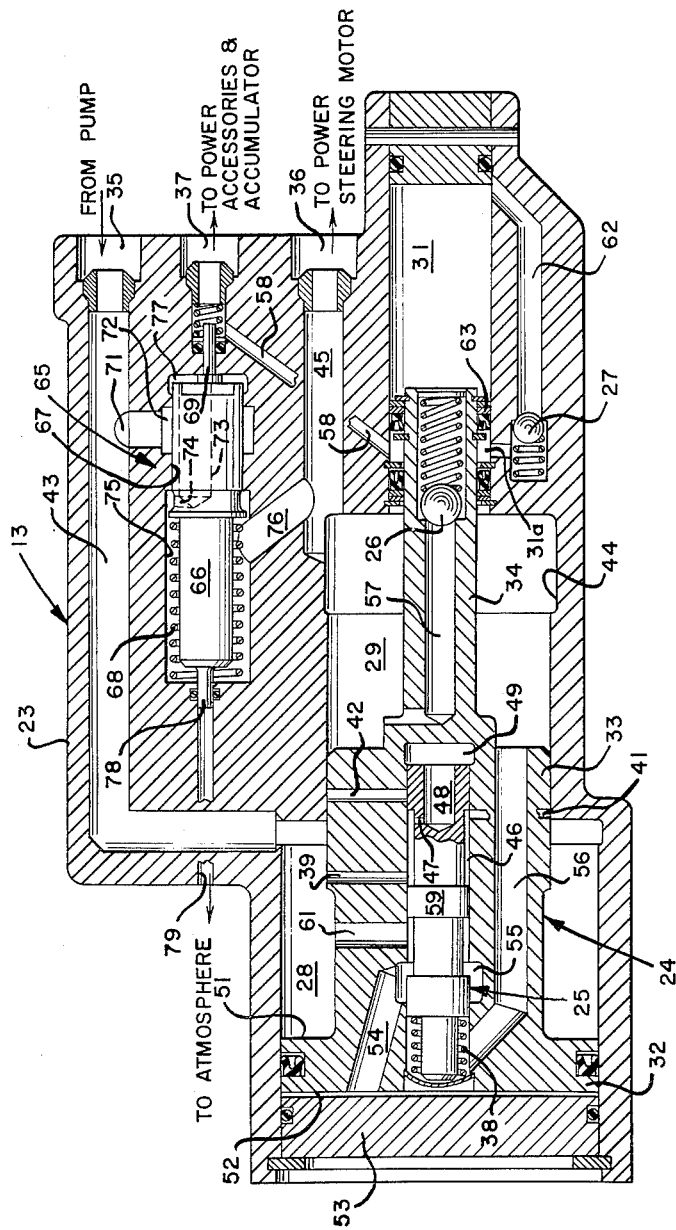
FIG. 2 is an enlarged semi-diagrammatical cross sectional view of the hydraulic intensifier embodied in the present invention.

Since the key unit in the hydraulic circuit outlined above is the intensifier 13, this structure is illustrated in detail in FIG. 2. The intensifier is illustrated in a diagrammatic sectional elevation view since the relationship of the components is most clearly seen in this form. However, it will be readily understood that the actual intensifier may have any suitable physical shape as may be required to avoid the intersection of passageways which are not intended to be interconnected.

The intensifier 13 assembly comprises a housing 23, a piston 24, a reversing valve 25, and two spring loaded non-return or ball-check valves 26 and 27. The housing 23 has a cylindrical bore therethrough, the bore being stepped to provide three chambers 28, 29 and 31 of respectively decreasing diameter. The piston 24 is a stepped piston provided with three cylindrical portions 32, 33 and 34 corresponding to the diameters of the respective chambers 28, 29 and 31.

The housing 23 is provided with three ports 35, 36 and 37 connected to the conduits 14, 15 and 19, respectively. The port 35, accordingly, receives hydraulic fluid at pump pressure; the port 36 is the return or exhaust connection and the port 37 is the outlet connection for fluid at intensified pressure.

The reversing valve 25 is spring urged by spring 38 in one direction, to the right with reference to FIG. 2, and is hydraulically actuated or moved in the opposite direction against the resistance of the spring. The reversing valve is a three connection, three position valve and is formed by spool 25 inside piston 24. The three connections are: (1) supply pressure through passage 61; (2) return pressure through passage 56; and (3) cylinder pressure through groove 55 and passage 54. In the spring offset position supply pressure from port 35 is blocked by spool 25 and the area on the left side of piston 24 is connected to return 36 through passage 54, groove 55, passage 56, chamber 29 and passage 45 to port 36. In the hydraulically offset position as shown in FIG. 2, supply pressure at port 35 is connected to the left area of piston 32 through chamber 28, passage 61, groove 55 and passage 54. The return connection of the valve is blocked. The purpose of the reversing valve is to reverse the direction of piston motion at each end of the piston stroke, as will be explained.

While structurally simple, the reversing control circuit is schematically rather complicated. The piston 24 inside the housing 23 forms a five position, five connection directional control pilot valve. The five connections are: (1) supply pressure at port 35; (2) return pressure at port 36; (3) pilot pressure through passageway 39; (4) pilot pressure through passageway 41; and (5) pilot pressure through passageway 42.

Movement of the piston 24 in the housing 23 affects the interconnection between the various passageways and ports in five major ways, which may be listed as follows:

(1) When the piston 24 is at a far right position, as viewed with reference to FIG. 2, and is just commencing movement to the left toward its FIG. 2 position, there is no communication between chamber 28 and passageway 39 because of the fit between piston portion 33 and the wall of the chamber 29. It should be noted here that the chamber 28 is in communication with the port 35 through the passageway 43. Passageways 41 and 42 are in communication with a slightly enlarged section 44 of chamber 29 and, therefore, are in communication with port 36 through passageway 45;

(2) After the piston 24 has moved slightly to the left, the communication between port 35 and passageway 39 remains closed or blocked, passageway 41 is blocked or cut off from communication with chamber 29 but passageway 42 remains in communication therewith;

(3) When the piston 24 nears its midstroke, passageways 39, 41 and 42 are blocked or cut off from communication with any of the chambers;

(4) As the piston 24 nears the left end of its stroke, port 35 and passageway 39 are in communication through chamber 28 and passageway 43. Passageways 41 and 42 remain blocked and, therefore, out of communication with chamber 29, passageway 45 and outlet port 36;

(5) When the piston 24 is at its far left position, as shown in FIG. 2, at reversal of its direction of movement, port 35 and passageway 39 are in communication, passageway 41 opens to chamber 28 and is therefore placed in communication with port 35, and passageway 42 remains blocked.

The right end of the reversing valve spool 25 provides another three connection, three position directional control valve in the pilot circuit. This control valve is formed by the groove or undercut 46 in the reversing valve spool body in cooperation with passageways 39 and 42, the latter two passageways forming two of the connections to the valve 25. The third connection of the valve is a drilled passageway 47 which intersects an axially extending passageway 48 opening through the right end of the valve spool. In the spring offset position, passageway 39 is blocked and passageway 42 is open to chamber 49 through passages 47 and 48. The valve may be nominally zero lapped in the centered position and manufacturing tolerances will determine whether it is either an open or closed center. In the fully hydraulic offset position, passageway 39 is open to chamber 49 and passageway 42 is closed.

The purpose of reducing the area of passageway 47 is to permit restricted fluid flow rate into and out of the cylinder bore 49 containing the reversing valve 25 and thereby dampens the motion of the valve spool when it shifts.

In considering the sequence of events during one cycle of operation of the intensifier, it will be assumed that the reversing valve 25 is in the spring offset position, that is, completely to the right in its cylinder bore 49, and the piston is at midstroke and is traveling to the left. Fluid under pressure is entering through port 35 to chamber 28 through passageway 43 and is acting on the surface 51 of the piston stepped portion 32. The other surface 52 of the piston stepped portion 32 is moving toward the end wall 53 of the housing 23 and the fluid trapped therebetween is being forced out through passageway 54, chamber 55 and passageway 56, all in the piston 24. As the piston moves to the left, part of the return flow into the chamber 29 flows through passageway 57 past non-return or check valve 26 into the chamber 31 behind the high pressure piston portion 34 of the piston 24. High pressure fluid displaced from chamber 31a is discharged through passageway 58 to the port 37. As the piston moves to the left, passageway 39 is in communication with chamber 28 but is blocked by the land 59 on the reversing valve 25 at this time. When the piston 24 reaches the left end of its stroke, passageway 41 is opened to chamber 28 connecting fluid under pump pressure to chamber 49 through passageways 47 and 48. This pressure acting on the right end of spool 25 causes the reversing valve to be shifted against the force of the spring 38. As the reversing valve shifts, compressing the offset spring, passageway 39 is opened and passageway 42 is closed. When the reversing valve 25 crosses its center position, it closes the connection between passages 54 and 56 and connects passages 54 and 61, thus fluid under pressure from port 35 is applied to the surface 52 of the piston 24, the fluid flow being through passageway 43, chamber 28, passageway 61 in the piston, chamber 55 and passageway 54. The piston 24 begins movement to the right closing passageway 41. Since passageway 39 is opened at both ends, the reversing valve 25 movement continues until it reaches the end of its travel with the connection between passageways 54 and 61 fully open so that the pressure drop across the opening is a minimum.

The piston 24 continuing its movement to the right, closes off passageway 39. As the piston moves to the right, fluid is displaced from chamber 31 by the piston 24 high pressure portion 34. This fluid cannot escape through valve 26 which is closed. Instead, it flows through passageway 62 through non-return valve 27 into the portion 31a of the chamber 31 behind the piston packing or seal 63. Since the displacement of chamber 31a is one half the displacement of chamber 31, the ratio being two to one, one half the volume displaced from chamber 31 is discharged through passageway 58 out the high pressure port 37.

Since the high pressure fluid discharge is controlled by the volume of the chamber 31a for both directions of movement of the piston 24, since it is the fluid in chamber 31a which is actually displaced into the passageway 58, the high pressure flow rate at the high pressure port is equal for either direction of piston movement, if the piston is moving at the same speed in either direction. With the piston 24 designed so that the area 52 is twice that of area 51 and with a constant supply rate of fluid, the velocity of the piston will be the same in either direction.

Further movement of the piston opens the upper end of passageway 42 to chamber 44 but the lower end of 42 remains blocked. Thus, there is at this time no change in reversing valve position. Additional movement of the piston to the right opens passageway 41 to the pressure in chamber 29, the return pressure side of the system. Since the spring 38 is exerting force, the pressure in the chamber 49 is higher than the pressure in chamber 29. Accordingly, fluid flows from the pilot area on the right end of the spool through passageways 48, 47 and 41 to chamber 29 and the reversing valve begins to shift to the spring offset position. As the reversing valve shifts, passageway 42 is opened to chamber 49 through groove 46 and passageways 47 and 48 and passageway 39 is again closed. Also, the connections of the reversing valve are changed; the fluid entrapped between piston surface 52 and end wall 53 is again connected to the return side of the system and the fluid flow from the side 51 of the piston 24 to the side 52 is cut off.

This piston then begins moving to the left again, first closing off passageway 41. Passageway 42 still remains open permitting the spring 38 to fully offset the reversing valve. Further movement of the piston 24 to the left closes passageway 42 and the intensifier is again at the point at which the description of the sequence of operations began.

The intensifier 13 as above described thus provides a constant flow supply for power steering through the port 36 while diverting a small portion of the pump 11 output for pressure amplification and ultimate discharge through the port 37. The pressure amplified fluid is used to charge the accumulator 21. For example, use of a 10:1 area ratio intensifier allows the accumulator to be charged to 1500 p.s.i. with less than a 200 p.s.i. load on the pump during charging. When the accumulator is charged to the desired pressure, a bypass unloading valve, generally designated 65, incorporated in the intensifier assembly shunts all the flow from the pump 11 to the control valve of the power steering unit 12. The bypass of flow continues until the pressure in the accumulator is reduced sufficiently to require the charging sequence to be repeated.

The bypass unloading valve 65, now to be explained in detail, has two functions: First, it controls the accumulator pressure. Second, it reduces the load on the pump when the accumulator is at the desired pressure.

The bypass unloading valve 65 is a two position, two connection directional control valve which is spring offset and hydraulically operated. The bypass valve 65 comprises a valve spool 66 reciprocable within a cylinder bore 67 in the intensifier housing 23. The valve spool 66 is normally spring-urged or offset to the right, as viewed in FIG. 2, by a spring 68. In this position the valve 65 is closed and the flow from the intensifier passageway 58 is able to exit only from the port 37 to the accumulator circuit. However, when the accumulator pressure reaches a predetermined pressure, the pressure build-up on the output side of the intensifier causes hydraulic operation of the valve. In other words, when the force caused by the output pressure at port 37 acting on the small plunger 69 projecting from the right end of the valve spool 66 is greater than the force of the offset spring 68 resisting movement of the valve spring, the valve moves into its open position.

In the open position, the flow from pump 11 passes directly through the bypass valve 65; not through the intensifier. The flow follows a path comprising a portion of passageway 43, passageway 71, chamber 72 (an enlargement of cylinder bore 67), axially extending passageway 73 in the valve spool 66, drilled passageway 74 intersecting passageway 73, chamber 75 of bore 67, passageway 76 into exhaust or return passageway 45.

In a prototype intensifier construction according to the principles of the present invention, the pressure differential between port 35 and port 36 with the bypass valve in the open position was less than 20 p.s.i. Thus, the bypass valve is effective to reduce the load on the pump 11, limits the output pressure, restores full flow to the power steering control valve, and lessens the service requirements of the intensifier.

In the spring offset position, its FIG. 2 position, the bypass valve 65 has substantially equal pressures acting on each end. The chambers 75 and 77 are connected through the passageways 73 and 74 and there is no flow through the connection when the valve is in its FIG. 2 or closed position. When the valve starts to open and flow occurs from the chamber 72 through the passageways 73 and 74 in the valve spool 66, the pressure at the spring chamber end 75 is less than the pressure at the chamber end 77 due to losses through the passage. In a prototype structure, this pressure differential was on the order of 10 p.s.i. Consequently, when the valve opens, another force, that due to the pressure differential acting on the ends of the valve spool 66, is added to the force caused by the output pressure acting on the small plunger 69. Since the force due to the output pressure is equal to the spring force when the valve opens, the additional or pressure differential force overbalances the spring 68 and the valve spool 66 moves to its stop in a fully open position.

The accumulator pressure range, that is, the differential between the pressure at which the bypass valve opens and the pressure at which it closes, can be controlled by dimensional selection of the size of the passageways 73 and 74 within the valve spool 66 and of the areas of the small plunger 69 and of the valve spool against which fluid pressure acts. The passageways 73 and 74 must be made relatively restricted since the pressure drop across the bypass valve cannot be made too small. If the pressure differential is too small, the bypass valve spool 66 will not shift quickly or completely.

It will be noted that the left end of spool 66 is provided with a small diameter cylindrical extension 78 reciprocal in bore 79. The bore 79 is vented to the atmosphere. The cross-sectional area of the extension 78 is equal to that of the plunger 69. The purpose of this extension 78 projecting into the vented bore 79 is to prevent any change in the accumulator pressure range due to increased pressure at port 36 because of a steering gear load.

It will be readily understood that when the bypass valve 65 is open, the piston 24 of the intensifier is idle. As soon as the bypass valve closes, the fluid circulation is shunted through the intensifier system and the piston 24 commences its reciprocatory motion with the results as described above.

It will be understood that the invention is not to be limited to the exact construction shown and described, but that various changes and modifications may be made without departing from the spirit and scope of the invention, as defined in the appended claims.

What is claimed is:

1. In a hydraulic intensifier, a housing containing a stepped diameter cylinder, pressure amplifying means comprising a unified piston assembly having low and high pressure piston portions reciprocable within respective low and high pressure portions of said cylinder, inlet conduit means for providing fluid from a low pressure source to the low pressure portion of said cylinder, a separate outlet conduit means connected to each of the low and high pressure portions of said cylinder, diversion means to divert a portion of the fluid from the low pressure portion of said cylinder to the high pressure portion thereof to be acted upon by said high pressure piston portion, the diversion occurring after said fluid at fluid source pressure acts on said low pressure piston portion to operate said pressure amplifying means to cause the fluid from said high pressure portion of said cylinder to be discharged from said intensifier at a higher pressure than the fluid from said low pressure portion, and bypass means effective to cause the fluid in said inlet conduit means to bypass said amplifying means and to flow directly from said inlet conduit means to the outlet conduit means connected to the low pressure portion of said cylinder, said bypass means including valve means responsive to the fluid in said outlet conduit means connected to the high pressure portion of said cylinder reaching a predetermined pressure.

2. In an intensifier for a central hydraulic system including a fluid pressure source; an intensifier housing comprising a relatively large cylinder, an intermediate cylinder and a relatively small cylinder in longitudinal alignment with each other; a piston having stepped portions slidably fitted within said large and intermediate cylinders and a stem piston portion extending into said small cylinder; conduit means in said housing connecting said fluid pressure source to said large cylinder at the inner end of the latter; an internal cylinder in said piston; passageways within said piston providing communication between said internal cylinder and in the side thereof in communication with the inner end of said large cylinder, the end in communication with the outer end of said large cylinder, and the end in communication with the intermediate cylinder; longitudinally shiftable valve means within said internal cylinder operative in one position to provide fluid flow communication through said piston between the inner and outer ends of said large cylinder while blocking fluid flow communication between the outer end of said large cylinder and the intermediate cylinder; the differential between the piston areas subject to fluid pressure when both ends of said large cylinder are in communication being such that said piston will be moved by fluid pressure in a direction from the outer end toward the inner end of said large cylinder, said valve means being automatically shiftable upon completion of movement of said piston in said one direction to block communication through said piston of the inner and outer ends of said large cylinder and to open the passageways between the ends of said piston; said piston then being moved by fluid pressure in the inner end of said large cylinder in the opposite direction and the fluid in the outer end of said large cylinder being discharged through said piston into said intermediate cylinder; said stem portion having an internal passageway open at opposite ends to said intermediate and small cylinders, respectively; valve means in said stem internal passageway preventing return flow of fluid from said small cylinder; a discharge conduit leading from said intermediate cylinder; fluid from said intermediate cylinder flowing simultaneously through said discharge conduit and through said internal passageway to said small cylinder upon movement of said piston in said opposite direction; the flow of fluid from said intermediate cylinder being only through said discharge conduit upon movement of said piston in said one direction; and a discharge conduit leading from said small cylinder; the fluid in said small cylinder being discharged therefrom at an intensified pressure upon reciprocation of said stem piston portion within said small cylinder as said piston reciprocates within said large and intermediate cylinders.

3. In an intensifier for a central hydraulic system including a fluid pressure source; an intensifier housing comprising a relatively large cylinder, an intermediate cylinder and a relatively small cylinder in longitudinal alignment with each other; a piston having stepped portions slidably fitted within said large and intermediate cylinders and a stem piston portion extending into said small cylinder; conduit means in said housing connecting said fluid pressure source to said large cylinder at the inner end of the latter; an internal cylinder in said piston; passageways within said piston providing communication between said internal cylinder and the side thereof in communication with the inner end of said large cylinder, the end in communication with the outer end of said large cylinder, and the end in communication with the intermediate cylinder; longitudinally shiftable valve means within said internal cylinder operative in one position to provide fluid flow communication through said piston between the inner and outer ends of said large cylinder while blocking fluid flow communication between the outer end of said large cylinder and the intermediate cylinder; the differential between the piston areas subject to fluid pressure when both ends of said large cylinder are in communication being such that said piston will be moved by fluid pressure in a direction from the outer end toward the inner end of said large cylinder; said valve means being automatically shiftable upon completion of movement of said piston in said one direction to block communication through said piston of the inner and outer ends of said large cylinder and to open the passageways between the ends of said piston; said piston then being moved by fluid pressure in the inner end of said large cylinder in the opposite direction and the fluid in the outer end of said large cylinder being discharged through said piston into said intermediate cylinder; said stem portion having an internal passageway open at opposite ends to said intermediate and small cylinders, respectively; valve means in said stem internal passageway preventing return flow of fluid from said small cylinder; a discharge conduit leading from said intermediate cylinder; fluid from said intermediate cylinder flowing simultaneously through said discharge conduit and through said internal passageway to said small cylinder upon movement of said piston in said opposite direction; a discharge conduit leading from said small cylinder adapted to be connected to a high pressure fluid accumulator; the fluid in said small cylinder being discharged through said last mentioned discharge conduit at an intensified pressure upon reciprocation of said stem piston portion within said small cylinder as said piston reciprocates within said large and intermediate cylinders; and pressure responsive valve means effective to cut off flow through said small cylinder discharge conduit to said accumulator upon the pressure in the latter reaching a predetermined maximum.

4. In an intensifier for a central hydraulic system including a fluid pressure source; an intensifier housing including a low pressure cylinder, an intermediate pressure cylinder and a high pressure cylinder; the cross sectional area of said cylinders being in inverse ratio to the fluid pressures therein; a piston having stepped portions slidably fitted within said low and intermediate pressure cylinders and a stem portion projecting into said high pressure cylinder; said stem portion having double acting piston means slidably fitted within said high pressure cylinder; conduit means in said housing connecting said fluid pressure source to said low pressure cylinder at the inner end of the latter; an internal cylinder in said piston; passageways within said piston providing communication between said internal cylinder and the side and each end of said piston; longitudinally shiftable valve means within said internal cylinder operative in one position to provide communication through said piston between the inner and outer ends of said low pressure cylinder while blocking communication through the passageways extending from one end of the piston to the other; the differential between the stepped piston areas within said low pressure cylinder subject to fluid pressure when both ends of said low pressure cylinder are in communication through said piston passageways being such that said piston will move in one direction from the outer end toward the inner end of said low pressure cylinder; said valve means being automatically shiftable upon completion of movement of said piston in said one direction to block communication through said piston of the inner and outer ends of said low pressure cylinder and to open the passageways between the ends of said piston; said piston being moved by the fluid pressure in the inner end of said low pressure cylinder in the opposite direction and the fluid in the outer end thereof being discharged through said piston into said intermediate pressure cylinder; said stem portion having an internal passageway opening at one end into said intermediate pressure cylinder and opening at its other end into said high pressure cylinder; check valve means in said stem internal passageway preventing return flow of fluid therethrough from said high pressure cylinder; a discharge conduit leading from said intermediate pressure cylinder; fluid from said intermediate pressure cylinder flowing simultaneously through said discharge conduit and through said internal passageway upon movement of said piston in said opposite direction; the flow of fluid from said intermediate pressure cylinder being only through said discharge conduit upon movement of said piston in said one direction; and a discharge conduit leading from said high pressure cylinder; the fluid in said high pressure cylinder being discharged therefrom at an intensified pressure upon movement of said double acting piston means on said stem portion as said piston reciprocates within said low and intermediate pressure cylinders.

5. In an intensifier for a central hydraulic system including a source of fluid under pressure; an intensifier housing including a relatively large cylinder at one end, a relatively small cylinder at the other end and an intermediate cylinder interposed between said large and small diameter cylinders; a piston having stepped portions slidably fitted within said large and intermediate cylinders and a stem portion projecting into said small cylinder; said stem portion being provided with double acting piston means on the end thereof; means encompassing said stem portion and sealing said small cylinder from said intermediate cylinder; the stepped portion of said piston within said intermediate cylinder sealing the latter from said large cylinder; conduit means connecting said fluid pressure source to said large diameter cylinder at the inner end thereof; said piston having an internal cylinder therein; conduit passageways providing communication between said internal cylinder and the side and each end of said piston; longitudinally shiftable valve means contained within said internal cylinder for controlling flow of fluid through said piston into the outer end of said large cylinder to move said piston toward the end of said housing at the small cylinder; said valve means being shiftable to block flow of fluid into said outer end whereupon the pressure of said fluid will act on said piston to drive the latter toward the outer end of said large cylinder; the fluid in said outer end of said large cylinder being discharged through said conduit passageway to said intermediate cylinder; said stem portion having an internal passageway extending from the side thereof in said intermediate cylinder and opening into said smaller cylinder; check valve means in said stem internal passageway preventing return flow of fluid from said small cylinder; a discharge conduit leading from said intermediate cylinder; fluid from said intermediate cylinder flowing simultaneously through said discharge conduit and through said internal passageway upon movement of said piston away from the small cylinder end of said housing; the flow of fluid from said intermediate cylinder being only through said discharge conduit upon movement of said piston toward the small cylinder end of said housing; and a discharge conduit leading from said small cylinder; the fluid in said small cylinder being discharged therefrom at an intensified pressure upon movement of the piston means carried on said stem as said large piston reciprocates within said large and intermediate cylinders.

6. In a hydraulic intensifier, a housing containing a stepped-diameter cylinder having its largest and smallest diameters at opposite ends, piston means comprising a large diameter low pressure piston portion movable within the large diameter end of said cylinder coupled to a small diameter high pressure piston portion movable within the small diameter end of said cylinder, an internal cylinder within said low pressure piston portion, reversing valve means slidable within said internal cylinder and positionable to direct fluid through said low pressure piston portion from a low pressure fluid source to one side thereof to move said piston means in one direction, said reversing valve means including spring means normally biasing said valve means in position to maintain communication between said low pressure fluid source and said one side, conduit means within said piston communicable with said internal cylinder to transmit fluid from said low pressure source to act on said valve means upon said piston means reaching the end of its stroke in said one direction to shift said valve means against the resistance of said spring means into position to place said low pressure fluid source in communication with the other side of said large diameter low pressure piston portion to cause reversal of the direction movement of said piston means, and conduit means effective to divert a portion of the fluid from said low pressure fluid source to the small diameter end of said cylinder after utilization of said low pressure fluid to move said piston means, the pressure of said diverted portion of said fluid being amplified by said small diameter high pressure piston portion and discharged through a pressure outlet from said small diameter end of said cylinder.

7. In a hydraulic intensifier; a housing having at least one low pressure fluid inlet port and at least one non-amplified pressure and one amplified pressure fluid outlet port; a stepped-diameter cylinder comprising a large, an intermediate and a small diameter portion; said fluid inlet port being in communication with the large diameter portion of said cylinder; said non-amplified pressure and amplified pressure outlet ports being in communication with said intermediate and small diameter portions of said cylinder, respectively; an integral stepped piston means provided with portions complementary to said cylinder portions; an internal cylinder in said piston means portion at the large end thereof; reversing valve means slidable within said internal cylinder and positionable to direct fluid through the large end of said piston means from said low pressure fluid inlet port to one side of said piston means portion within said cylinder large diameter portion; biasing means mechanically acting against said valve means to maintain the same in condition to effect communication between said low pressure fluid inlet and said one side; conduit means communicable with said internal cylinder upon said piston assembly reaching the end of its stroke in one direction to transmit low pressure fluid to hydraulically shift said reversing valve means against the resistance of said biasing means into position to direct low pressure fluid through passageways in said piston means portion within said cylinder large diameter portion to the other side thereof; thereby to reverse the direction of movement of said piston means; and further conduit means in said housing effective to divert a portion of the fluid from said low pressure fluid source to the small diameter end of said cylinder after utilization of said low pressure fluid to move said piston means, the pressure of said diverted portion of said fluid being amplified by said small diameter high pressure piston portion and discharged through said amplified pressure outlet port as the nondiverted portion of said fluid is discharged from said intermediate diameter cylinder portion through said non-amplified pressure outlet.

8. In a hydraulic intensifier; a housing having at least one low pressure fluid inlet port and at least one non-amplified pressure and one amplified pressure fluid outlet; a stepped-diameter cylinder comprising a large, an intermediate and a small portion; said fluid inlet port being in communication with the large portion of said cylinder; said non-amplified pressure and amplified pressure outlet ports being in communication with said intermediate and small portions of said cylinder, respectively; an integral piston means provided with portions complementary to said cylinder portions; an internal cylinder in said piston means portion at the large end thereof; a reversing valve means slidable within said internal cylinder and positionable to direct fluid through the large end of said piston means from said low pressure fluid inlet port to one side of said piston means portion within said cylinder large portion; biasing means mechanically acting against said valve means to maintain the same in condition to effect communication between said low pressure fluid inlet and said one side; conduit means communicable with said internal cylinder upon said piston assembly reaching the end of its stroke in one direction to transmit low pressure fluid to hydraulically shift said reversing valve means against the resistance of said biasing means into position to direct low pressure fluid through passageways within the piston means portion within said cylinder large portion to the other side of said piston means, thereby to reverse the direction of movement of said piston means; further conduit means in said housing effective to divert a portion of the fluid from said low pressure fluid source to the small diameter end of said cylinder after utilization of said low pressure fluid to move said piston means; the pressure of said diverted portion being amplified by said piston means and discharged through said amplified pressure outlet as the non-diverted portion of said fluid is discharged from said intermediate diameter cylinder portion through said non-amplified pressure outlet; and bypass means effective to cause the fluid from said low pressure inlet to flow directly to said non-amplified pressure outlet upon the fluid passing through said amplified pressure outlet reaching a predetermined pressure.

References Cited in the file of this patent

UNITED STATES PATENTS

| 1,970,999 | Ferris et al. | Aug. 21, 1934 |
| 2,351,872 | Parker | June 20, 1944 |
| 2,472,695 | Chouings | June 7, 1949 |
| 2,587,571 | Lombard | Feb. 26, 1952 |
| 2,793,498 | Banker | May 28, 1957 |

FOREIGN PATENTS

| 1,156,454 | France | Dec. 16, 1957 |